(No Model.)
A. DOW.
REGULATOR FOR DYNAMO ELECTRIC MACHINES.
No. 486,417. Patented Nov. 15, 1892.
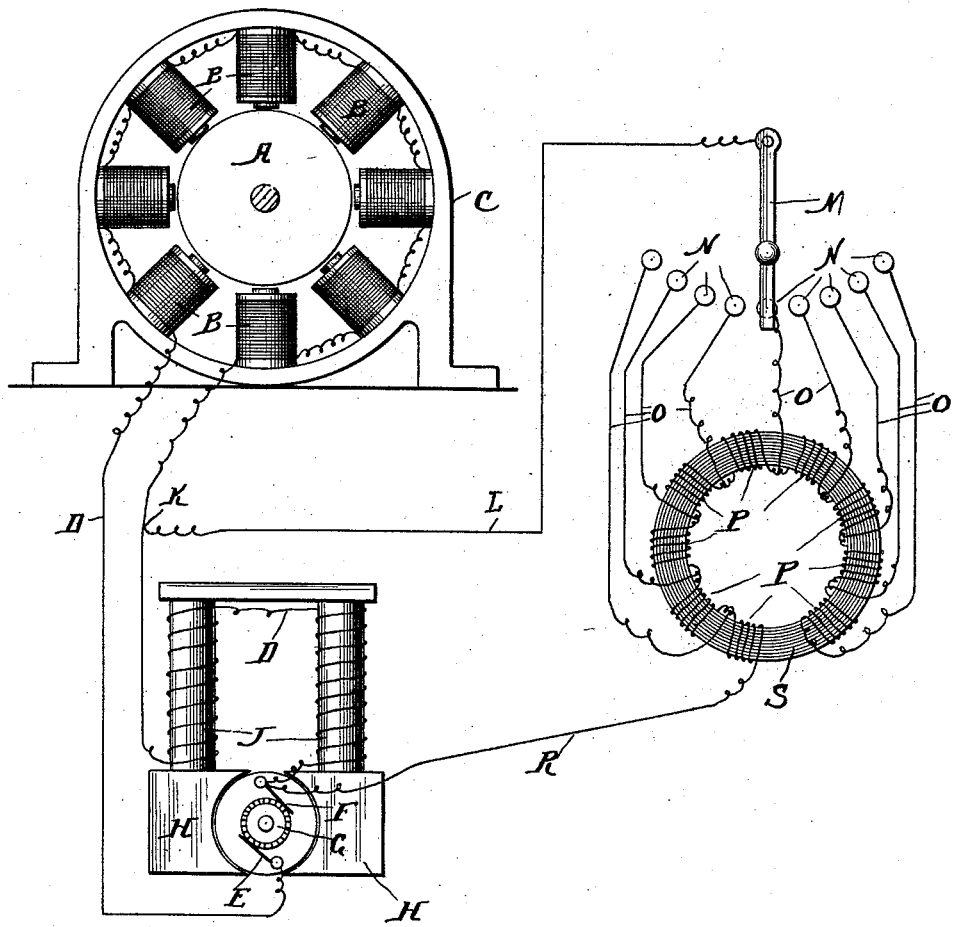
Witnesses:
Celeste P. Chapman.
Francis M. Ireland.
Inventor:
Alexander Dow
By Francis W. Parker
Attorney.

UNITED STATES PATENT OFFICE.

ALEXANDER DOW, OF ELGIN, ILLINOIS.

REGULATOR FOR DYNAMO-ELECTRIC MACHINES.

SPECIFICATION forming part of Letters Patent No. 486,417, dated November 15, 1892.

Application filed March 20, 1891. Serial No. 385,773. (No model.)

*To all whom it may concern:*

Be it known that I, ALEXANDER DOW, a subject of the Queen of Great Britain, residing at Elgin, in the county of Kane and State of Illinois, have invented a certain new and useful Improvement in Regulators for Dynamo-Electric Machines, of which the following is a full, clear, and exact specification.

My invention relates to regulators for dynamo-electric machines, and has for its object to provide devices whereby the current from a generator may be regulated when the field of such generator is excited in whole or part by pulsating current.

My invention is illustrated in one form, though I have contemplated its application through a wide variety of forms in the accompanying diagrammatic sketch, wherein—

A represents the armature, B B the field-magnets, and C the frame, of an alternator.

D is the conductor which traverses such field-magnets and is connected at one end with the brush E and at the other end with the brush F of an exciting-generator whose armature is indicated by the letter G, its poles by the letters H H, and its field-magnet, about which such conductor D passes, by the letter J. At the point K on the conductor D branches the conductor L, which leads to the pivoted arm M, adapted to move over a series of contact-plates N N, each of which is connected with a conductor O, each of which conductors leads to a coil P. The said coils are themselves connected in series, and the last coil is connected by the conductor R with the brush F. These several coils are passed about suitable rings, or they may all pass about the same ring S S, whereby a certain inductance may be obtained. The proportions and arrangements of these several parts may be obviously or greatly altered or varied without departing from the spirit of my invention, and particularly have I designed to greatly vary the method of connecting the several parts here shown or the method of arranging conductors, so as to secure, under various conditions and with various kinds of machines, the effect or results hereinafter set forth. I do not wish to be limited to the application of the principles herein elucidated for the purpose of regulating an exciter generator or alternator, as I contemplate their application to various uses—as, for example, in connection with generators in which the field-magnets are wound or connected otherwise than as shown, and which may be used to supply motors and the like, and for other purposes than exciting the field of an alternator.

The use and operation of my invention are substantially as follows: I particularly describe its application as I have illustrated it for the purpose of regulating a generator used to excite the fields of an alternator, and thus to regulate the current delivered by such alternator. Alternators have two essential parts—namely, field-magnets whose function it is to create a field of force and an armature which is moved in such field of force and in whose conductors currents are generated. The magnetism of the field-magnets is produced by the circulation around them of a current of electricity which is direct as distinguished from an alternating current, and is usually called the "exciting-current." It is commonly produced by a small dynamo called an "exciter." This exciter may be of any of the ordinary types of dynamos which have been found useful for this purpose; but I have shown it as a series-wound machine in which the whole current generated by the exciter passes through its own field, except such portion as may be diverted through the regulator proper. The current generated by an alternator must vary in amount or electro-motive force with the variation in quantity of lamps it lights or of other work done by it. To regulate this variation to the exact requirements of the work to be done, it is customary to vary the intensity of the alternator's field of force by varying its exciting-current. This may be accomplished by making a shunt around the field-magnet winding of the exciter and varying the resistance of such shunt so as to vary the amount of current flowing through the exciter's field-magnet, and thus vary the field so as to regulate the current from the exciter, and thus in turn regulate the current delivered by the alternator. The regulator-shunt as usually constructed for this purpose consists of a number of wire spirals and means for varying the number of such spirals in circuit. Such spirals have resistance bearing a certain proportion to the resistance of field-magnet windings of the exciter, but have no effective inductance. In my invention as applied in the manner shown in the drawings I secure considerable inductance in such shunt-circuit and the proportions of inductance and resistance in such shunt to the inductance and resistance of the field-magnet of the exciter is such in each case as to produce the desired result. In the specific form shown I have secured this inductance by winding resistance coils on cores of magnetic material; but of course the same result would be accomplished in various ways. Such a coil becomes a sort of choking-coil, and other or additional resistance may be placed in the shunt-circuit. However, this construction may be varied. The relation of such regulating device so adapted to exhibit resistance and inductance must be such with reference to the field-magnets of the generator or exciter as to bring about the desired result. To describe the operation in the present instance, I will add as follows: There is reactive induction between the armature of the alternator and its field-magnets in such manner that the generation of alternating currents in the armature induces alternating current in the windings of the field-magnets. These induced currents are proportional to the alternating currents in the armature and are added to the exciting direct current, increasing it when they tend to flow in the same direction as it does and reducing it when they tend to flow in the reverse direction, so that the resultant current is pulsatory, and its pulsations are greater in range as the armature-current of the alternator is greater. Now whereas the current of the exciter when steady would divide itself between the exciter field-magnet windings and the regulating-shunt in proportion to the respective resistances of the two paths; it will when pulsatory divide in proportion, also, to their respective inductances. If the regulator-shunt be constructed with little or no inductance, an undue quantity of the pulsatory current will pass by way of it and the exciter field-magnets will be weakened proportionally. If the regulating device in the shunt be given an effective inductance, the proportion of current passed through the field-magnets may be determined by varying such inductance.

Given the condition of a generator whose fields are excited in whole or in part by a pulsating current, it is clear that a regulator itself supplied with a pulsating current may be so proportioned and placed in relation to such field-magnets or their windings along the lines hereinbefore laid down, so that any change in the range of pulsation of the current in the regulating device will determine the effective value of the current traversing the field-magnet windings.

I claim—

1. The combination of a generator whose field-magnets are traversed by a pulsating current with a regulator in a shunt around the said field-magnets, such field-magnets and regulator being independent of the main working circuit, the inductance and resistance of the said regulator and field-magnets being so proportioned that the current produced by the said generator will divide itself between the said regulator and field-magnets in a ratio varying in accordance with the varying range of pulsation of the said current, so as to make the generator self-regulating.

2. The combination of a dynamo-electric machine with field-magnets whose coils are traversed by a pulsating current with a regulator adapted to vary the said current in the field responsive directly to the varying range of pulsation of such current, and said field-magnets and regulator being independent of the main working circuit.

3. The combination of a generator with field-magnets whose coils are traversed by a pulsating current with an exciter for such field-magnets and a regulator adapted to vary the current in the field of the exciter responsive directly to the varying range of pulsation of such current, and said field-magnets and regulator being independent of the main working circuit.

4. The combination of a generator for exciting the field-magnets of an alternator, the field-magnets of said generator being traversed by a portion of its own current, and a regulating device in a shunt or derived circuit about such field-magnets of the exciter, said regulating device responsive directly to the varying range of pulsation of said current, and said field-magnets and regulator being independent of the main working circuit.

5. The combination of a generator for exciting the field-magnets of an alternator, the field-magnets of said generator being traversed by a portion of its own current, and a regulating device in a shunt or derived circuit about such field-magnets of the exciter, said regulating device containing resistance-coils and magnetic material associated therewith, and said field-magnets and regulator being independent of the main working circuit.

ALEXANDER DOW.

Witnesses:
 FRANCIS W. PARKER,
 CELESTE P. CHAPMAN.